(12) United States Patent
Kang (10) Patent No.: US 8,700,074 B2
(45) Date of Patent: *Apr. 15, 2014

(54) METHOD AND APPARATUS FOR MANAGING MESSAGE HISTORY DATA FOR A MOBILE COMMUNICATION DEVICE

(75) Inventor: Ji Eun Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 146 days.

This patent is subject to a terminal disclaimer.

(21) Appl. No.: 13/171,231

(22) Filed: Jun. 28, 2011

(65) Prior Publication Data

US 2011/0256851 A1     Oct. 20, 2011

Related U.S. Application Data

(63) Continuation of application No. 11/858,453, filed on Sep. 20, 2007, now Pat. No. 7,986,942, which is a continuation of application No. 10/888,182, filed on Jul. 9, 2004, now Pat. No. 7,917,125.

(30) Foreign Application Priority Data

Jul. 21, 2003   (KR) ................ 10-2003-0049786

(51) Int. Cl.
*H04W 4/00*     (2009.01)

(52) U.S. Cl.
USPC ............. 455/466; 455/412.1; 455/412.2; 455/415; 455/566

(58) Field of Classification Search
USPC .......... 455/412.1–414.2, 415, 466, 566–567
See application file for complete search history.

(56) References Cited

U.S. PATENT DOCUMENTS

| | | | |
|---|---|---|---|
| 5,604,921 A | 2/1997 | Alanara | |
| 6,064,877 A | 5/2000 | Yanagida | |
| 6,266,159 B1 | 7/2001 | Otsuka et al. | |
| 6,298,239 B1 | 10/2001 | Yonemoto et al. | |
| 6,424,829 B1 | 7/2002 | Kraft | |
| 6,498,931 B1 | 12/2002 | Mayak et al. | |
| 6,671,508 B1 | 12/2003 | Mitsuoka et al. | |
| 6,697,421 B1 | 2/2004 | Monroe et al. | |
| 6,720,863 B2 * | 4/2004 | Hull et al. ................ | 340/7.51 |
| 6,738,636 B2 | 5/2004 | Lielbriedis | |
| 6,751,463 B1 | 6/2004 | Lorello et al. | |
| 6,775,696 B1 | 8/2004 | Hansen | |
| 6,879,822 B2 | 4/2005 | Silvester | |
| 6,947,738 B2 * | 9/2005 | Skog et al. ................ | 455/426.1 |
| 7,289,614 B1 * | 10/2007 | Twerdahl et al. ........ | 379/142.01 |
| 7,295,836 B2 | 11/2007 | Yach et al. | |
| 7,669,134 B1 | 2/2010 | Christie et al. | |
| 8,185,506 B2 * | 5/2012 | Kang et al. ................ | 707/684 |

(Continued)

FOREIGN PATENT DOCUMENTS

| | | |
|---|---|---|
| KR | 1020030006694 | 1/2003 |
| KR | 1020030032584 | 4/2003 |

*Primary Examiner* — Dai A Phuong
(74) *Attorney, Agent, or Firm* — Lee, Hong, Degerman, Kang & Waimey (57) ABSTRACT

A method and apparatus for managing history data of messages received from and transmitted to other users by a user of a mobile communication device is provided. Message history data is extracted from received and transmitted messages and stored such that a user of the mobile communication device may easily input a conditional request to the device and view message history data associated with a specific other user or message history data identified by conditional data input to the device.

50 Claims, 6 Drawing Sheets

(56) References Cited

U.S. PATENT DOCUMENTS

| | | |
|---|---|---|
| 2001/0011021 A1 | 8/2001 | Nonami |
| 2001/0042103 A1 | 11/2001 | Tomari et al. |
| 2002/0022954 A1* | 2/2002 | Shimohata et al. ............... 704/3 |
| 2002/0029246 A1 | 3/2002 | Kumagai |
| 2002/0037754 A1 | 3/2002 | Hama et al. |
| 2002/0142758 A1* | 10/2002 | Abiko et al. .................. 455/412 |
| 2003/0064707 A1* | 4/2003 | Yoneyama .................... 455/412 |
| 2003/0078034 A1 | 4/2003 | Tsutsumi et al. |
| 2003/0194990 A1 | 10/2003 | Helferich |
| 2003/0228863 A1 | 12/2003 | Vander et al. |
| 2004/0209605 A1* | 10/2004 | Urban et al. ................... 455/415 |
| 2004/0214610 A1* | 10/2004 | Tanemura et al. ............ 455/566 |
| 2004/0224670 A1 | 11/2004 | Hull et al. |
| 2004/0235520 A1* | 11/2004 | Cadiz et al. ................... 455/557 |
| 2004/0242202 A1 | 12/2004 | Torvinen |
| 2005/0076338 A1 | 4/2005 | Malik |
| 2007/0201653 A1 | 8/2007 | Tsukamoto |
| 2008/0250336 A1* | 10/2008 | Gusler et al. .................. 715/753 |
| 2013/0022038 A1* | 1/2013 | Cadiz et al. ................... 370/352 |

* cited by examiner

| Message history data associated with Lee Cheolsu |
|---|
| 1) 2003/03/04 12:30 transmitted O.K Let's meet in front of the restaurant... |
| 2) 2003/03/04 12:31 received Let's go having a meal |
| 3) 2003/03/04 12:32 received Sleep now? |
| 4) 2003/03/04 12:33 received School |
| 5) 2003/03/04 12:34 received Where? |
| Previous | Selection |

METHOD AND APPARATUS FOR MANAGING MESSAGE HISTORY DATA FOR A MOBILE COMMUNICATION DEVICE

CROSS-REFERENCE TO RELATED APPLICATIONS

This application is a continuation of U.S. patent application Ser. No. 11/858,453, filed on Sep. 20, 2007, now U.S. Pat. No. 7,986,942, which is a continuation of U.S. patent application Ser. No. 10/888,182, filed on Jul. 9, 2004, now U.S. Pat. No. 7,917,125, which claims the benefit of earlier filing date and right of priority to Korean Patent Application No. 10-2003-0049786, filed on Jul. 21, 2003, the contents of which are hereby incorporated by reference herein in their entirety.

BACKGROUND OF THE INVENTION

1. Field of the Invention

The present invention relates to a method and apparatus for managing history data, and more specifically to a method and apparatus for managing history data of messages received from and transmitted to other users by a user of a mobile communication device.

2. Description of the Related Art

Many mobile phones are capable of transmitting and receiving messages such as SMS (Short Messages Service), MMS (Multimedia Message Service), and USSD (Unstructured Supplementary Service Data). The use of such messages is increasing.

Messages received and transmitted by a mobile phone are generally stored in chronological order in a message deposit box having a received message box and a transmitted message box, respectively. A user may separately view messages received and messages transmitted utilizing the received message box and the transmitted message box.

However, if a user desires to view the messages transmitted to or received from a specific other user, all messages in the received message box or the transmitted message box must be viewed. Viewing all received messages or transmitted messages in order to find the messages from the specific other user that a user desires to view is considerably troublesome and the user wastes time indexing through messages transmitted to or received from other users that it is not desired to view.

A method of classifying, viewing and erasing messages in accordance with search criteria input by a user is disclosed in Korean Patent Publication No. 2003-0032584, which was filed on Oct. 18, 2001 and assigned to the present applicant. Although a method for classifying the messages in accordance with the user's request is disclosed, the method does not adequately allow classification of transmitted messages and received messages such that messages transmitted to or received from a specific other user may be easily viewed.

Therefore, there is a need for a method and apparatus for classifying, viewing and erasing messages in accordance with search criteria input by a user that facilitates a user easily viewing messages transmitted to or received from a specific other user. The present invention addresses these and other needs.

SUMMARY OF THE INVENTION

Accordingly, the present invention is directed to a method and apparatus for managing history data of messages received from and transmitted to other users by a user of a mobile communication device.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a mobile communication device that allows the user to manage history data of messages such that messages and related information received from and transmitted to other users may be viewed without having to view all messages received from or transmitted to other users.

In one aspect of the invention, a method is provided for managing history data of messages received and transmitted by a mobile communication device. The method includes storing message history data of the received messages and the transmitted messages in a storage unit, receiving a conditional request from the user of the device for message history data, processing the conditional request to read message history data corresponding to the conditional request from the storage unit, and outputting the message history data.

It is contemplated that the message history data may include one or more of a time when a message has been recorded (received or transmitted) in the mobile communication device, data for identifying whether the message has been received or transmitted, and all or a part of the received or transmitted message. It is further contemplated that the message history data for received messages and the message history data for transmitted messages may be stored in separate storage areas, preferably in chronological order. In a preferred embodiment, the storage area in which the message history data for received messages is stored and the storage area in which the message history data for transmitted messages is stored are also separate from the storage area in which the received messages are stored and the storage area in which the transmitted messages are stored.

The message history data of the all received messages may be stored together in the storage unit and the message history data of all transmitted messages may be stored together in the storage unit. Alternately, the message history data associated with each specific other user may be stored together in a specific area of the storage unit such that no area of the storage unit comprises message history data associated with more than one specific other user Message history data may be stored for all messages received and transmitted by a user of the mobile communication device. In a preferred embodiment, the user of the mobile communication device may designate that message history data be stored only for messages transmitted to and received from specific other users.

A conditional request from the user of the device identifies the message history data that is desired. The user may utilize a displayed menu that identifies the other users for whom message history data is available, for example by name, phone number or nickname. Alternately, the user may input conditional data identifying the message history data desired.

In a preferred embodiment, the user of the mobile communication device may request message history data by inputting conditional data indicating a name of a specific other user, a phone number of a specific other user, indicating whether message history data is desired for received or transmitted messages, or indicating a time period for which message history data is desired.

It is contemplated that the user of the mobile communication device may indicate that the message history data is "password protected" such that a conditional request is processed only if a password input matches a predetermined password set by the user. It is further contemplated that the user of the mobile communication device may designate that only specific message history data is "password protected" such that a password comparison is performed only if the designated specific message history data is requested.

It is contemplated that processing a conditional request may include reading message history data corresponding to the processed conditional request and arranging the message history data in chronological order. Furthermore, it is contemplated that processing a conditional request may include reading message history data corresponding to the processed conditional request and arranging the message history data according to whether the corresponding message is a received message or a transmitted message. Moreover, it is contemplated that the received or transmitted message corresponding to the requested message history data or a file attached to the corresponding message may also be output.

The method may also include erasing one or more stored received or transmitted messages without erasing the corresponding message history data. The method may also include transmitting the stored message history data to another device, for example an external memory device, a personal computer, or a notebook computer having storage capacity, such that the message history data is not stored in the mobile communication device. It is contemplated that the method may be utilized with messages of various types, for example SMS, MMS or USSD.

In another aspect of the present invention, a mobile communication device apparatus is provided for managing history data of messages received and transmitted by a user of the device. The mobile communication device is adapted to perform the methods of the present invention to store message history data of the received messages and the transmitted messages in the storage unit, receive a conditional request for message history data input by the user, read message history data corresponding to the conditional request from the storage unit, and output the message history data.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

The present invention relates to a method and apparatus for managing history data of messages received from and transmitted to other users by a user of a mobile communication device. Although the present invention is illustrated with respect to messages received and transmitted by a mobile phone, it is contemplated that the present invention may be utilized anytime it is desired to manage messages of any type received and transmitted by the user of any communication device.

The attached drawings for illustrating exemplary embodiments of the present invention are referred to in order to gain a sufficient understanding of the present invention, the merits thereof, and the objectives accomplished by the implementation of the present invention.

The present invention can be applied to all mobile communication devices capable of receiving and transmitting messages. Furthermore, since the capability to receive and transmit messages has been provided in wired phones, it is contemplated that the present invention may be also applied to wired phones.

A general mobile communication device to which the present invention may be applied has data receiving and transmitting circuitry, a display unit, a data storage unit, a data output unit, a menu setting function for allowing a user to set a specific function, and a programmable control unit for controlling the electronic circuits and the functions of the device. The present invention is described in detail with reference to the attached drawings as embodied in a mobile phone.

The mobile phone has a module for extracting the history data from messages received and transmitted by the user and storing the extracted history data in the storage unit. The mobile phone also has a menu function that allows a user to request and retrieve history data of messages received from and transmitted to other users.

As used herein, "message" or "messages" may be SMS (Short Message Service) messages, MMS (Multimedia Message Service) messages, or USSD (Unstructured Supplementary Service Data) messages. The message history data includes identifying attributes of messages received from and transmitted to other users using the mobile phone.

Figure 1:
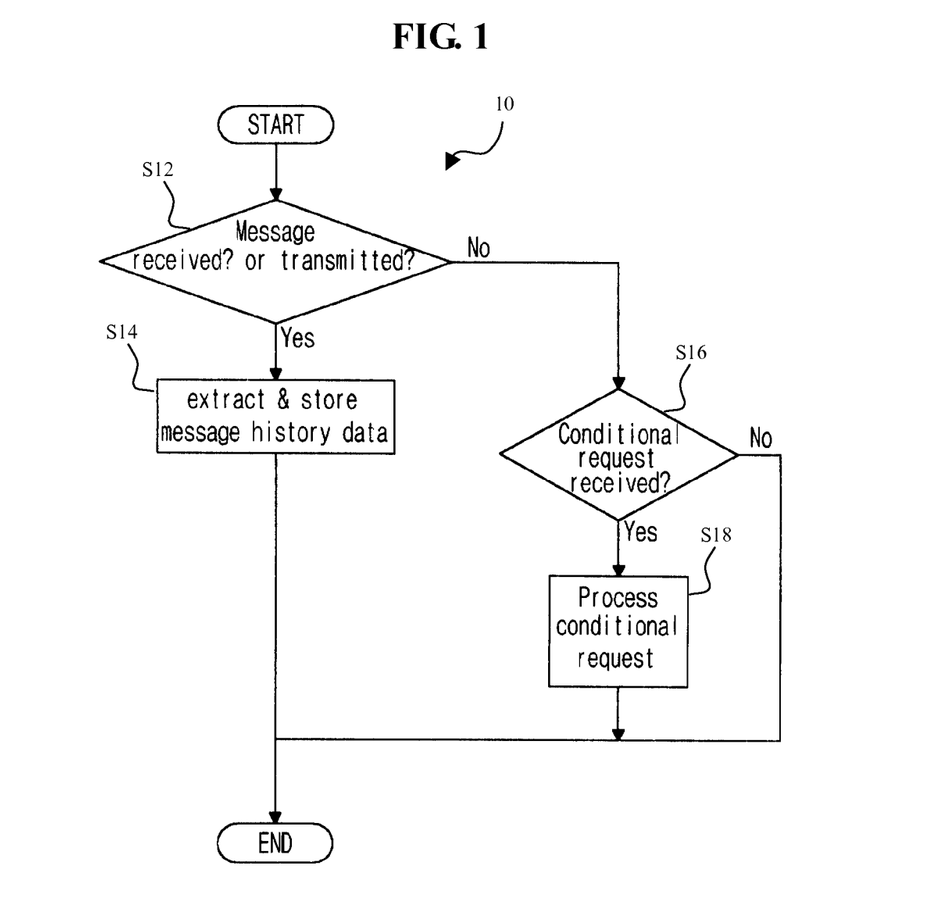
FIG. 1 is a flowchart illustrating a method for managing history data of messages received and transmitted by a user of a mobile communication device according to one embodiment of the present invention.

Referring to FIG. 1, a method of managing history data of messages according to one embodiment of the invention is illustrated. The method 10 includes determining if a message is received or transmitted (S12) and storing the message history data from the message (S14) and receiving (S16) and processing (S18) a conditional request for stored message history data.

Every time a message is received or transmitted in step S12 by the mobile phone, the message is processed to extract and store the message history data in step S14. In step S14, the history data of every received and transmitted message may be extracted, with the extracted history data stored in a specified area of the storage unit. In a preferred embodiment, the user is able to designate specific other users for whom message history data is stored and message history data is extracted and stored in step S14 only when messages are received from or transmitted to a designated specific user.

When a conditional request for stored message history data is received in step S16, the conditional request is processed in step S18. The message history data requested is read from the storage unit and output. In a preferred embodiment, the user is able to "password protect" the stored message history data by setting a predetermined password and the requested message history data is read from the storage area and output only if the predetermined password is input.

By password protecting the message history data, the user may protect his privacy. The message history associated with all other users may be password protected or the user may designate specific other users for password protection and allow the message history data associated with non-designated other users to be accessed without a password.

Figure 2:
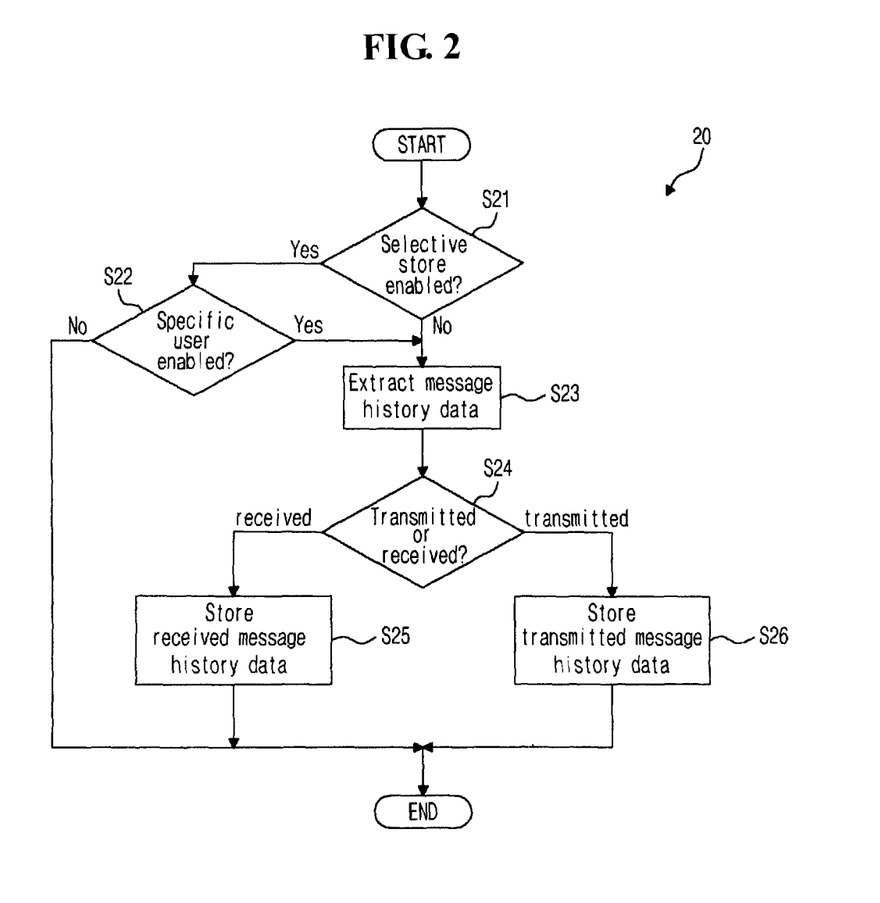
FIG. 2 is a flowchart illustrating a method for storing message history data extracted from received messages and transmitted messages according to one embodiment of the present invention.

Referring to FIG. 2, a method of storing the message history data extracted from received and transmitted messages is illustrated. The method 20 includes determining if the user has indicated that only message history data for messages received from and transmitted to designated other users ("selective store enabled") is to be stored (S21) and, if so, determining if the current message was received from or transmitted to one of the designated ("specific user enabled") other users (S22), extracting message history data from the current message (S23), determining if the current message was transmitted or received (S24) and storing the extracted message history data in the appropriate area of the storage unit (S25, S26).

If the user has indicated that only message history data for messages received from and transmitted to designated other users ("selective store enabled") is to be stored and the current message is determined to not be associated with a designated other user ("specific user not enabled") in step S22, the message history data is not extracted from the current message and stored. Selectively storing only the message history data of messages received from and transmitted to certain designated other users allows more efficient utilization of the available memory space of the storage unit.

The user presets the specific users for whom message history data should be stored. The user may select a specific other user from, for example, a telephone directory menu contained in the mobile phone and press a key on a keypad for setting a "specific user enabled" condition for the specific other user.

The message history data may include one or more of a time when the message was received or transmitted, data identifying whether the message is a received message or a transmitted message, and all or a part of the corresponding message. Preferably, the message history data is stored in chronological order according to when the message from which it was extracted was received or transmitted.

The message history data of received messages may be stored in an area of the storage unit separate from the area in which the message history data of transmitted messages is stored. Furthermore, the message history data of the received and transmitted messages may be stored in an area of the storage unit separate from the area where the received and transmitted messages are stored. Since the message history data is stored in a different area of the storage area than the messages, the user may erase the received messages or the transmitted messages without erasing the corresponding message history data.

The message history data of all other users may be stored together or a separate area of the storage unit may be used to store the message history data for each specific other user such that a specific area of the storage unit contains the message history data for all the received or transmitted messages associated with a specific other user. If a separate area of the storage unit is utilized to store the message history data for each specific other user, the entire area of the storage unit corresponding to the specific other user may be read when message history data for that other user is requested.

Figure 3:
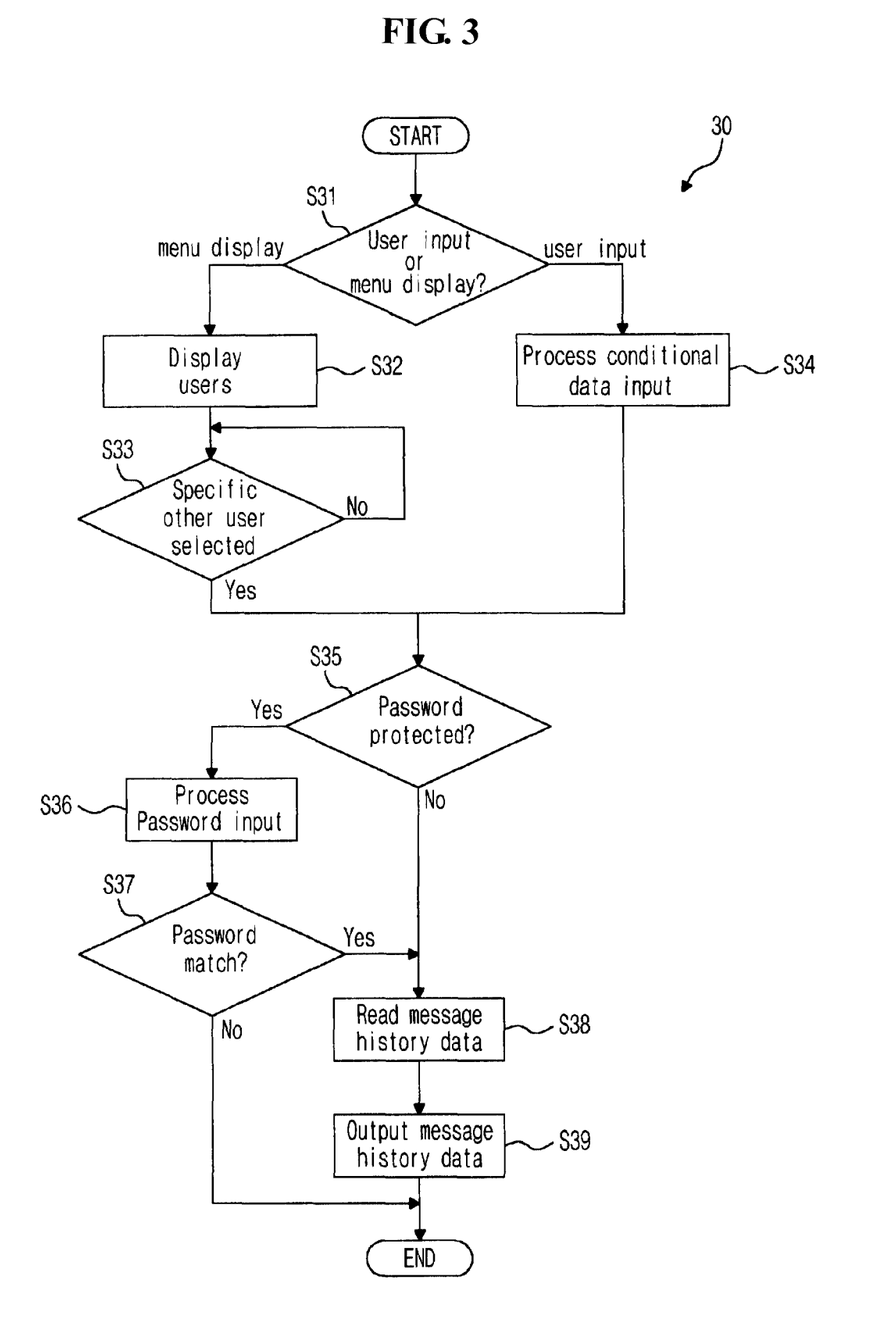
FIG. 3 is a flowchart illustrating a method for processing conditional requests for message history data according to one embodiment of the present invention.

Referring to FIG. 3, a method for processing a conditional request for message history data is illustrated. The method 30 includes determining if the user desires to use a menu to select the desired message history data or input conditional data (S31), either displaying a list of specific other users (S32) and allowing the user to select a specific other user from the list (S33) or processing conditional data input by the user, determining if the desired message history data is password protected (S35) and, if so, determining if the password input (S36) matches the preset password (S37), reading the desired message history data from the storage unit (S38), and outputting the message history data (S39).

Figure 4A:
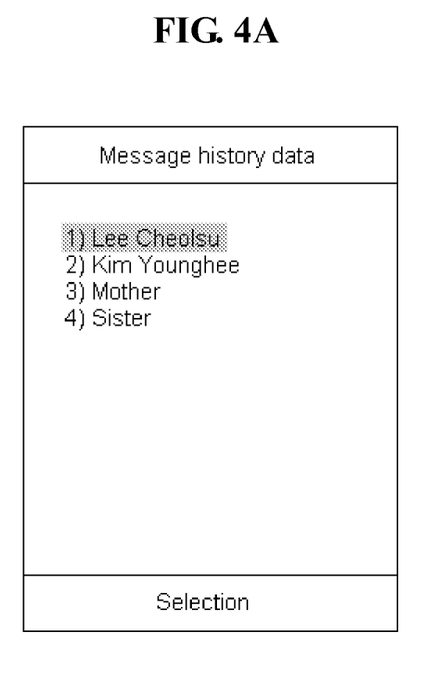
FIG. 4A illustrates a display screen for selecting message history data related to messages transmitted to and received from a specific other user according to one embodiment of the present invention.

If it is determined in step S31 that the user desires to select the message history data from a menu, a list of specific other users for whom message history data is available is displayed in step S32. FIG. 4A illustrates the selection menu displayed in one embodiment of the invention.

Referring to FIG. 4A, the user selects one of the displayed specific other users for whom message history data is desired in step S33, for example by utilizing upward and downward shift keys to move a cursor to the desired name or pressing the numeral key on a keypad of the mobile phone corresponding to the numeral displayed next to the name of the specific other user. Although a list of names is illustrated in FIG. 4A, it is contemplated that the menu may display a list of phone numbers or nicknames specified by the user or any other attribute that identifies specific other users for whom message history data is available.

If it is determined in step S31 that the user desires to input conditional data identifying the message history data desired, the conditional data input by the user is processed in step S34. The conditional data may include one or more of a name of a specific other user, a phone number of a specific other user, data indicating that message history data is desired for received messages or transmitted messages, or data indicating that message history data is desired for messages during a specified time period.

Once the user has selected the message history data desired in step S33 or step S34, it is determined in step S35 if the requested message history data is password protected. If the requested data is password protected, the user is prompted to input a password in step S36 and the input password is compared to a preset password in step S37.

If the requested message history data is not password protected or the input password matches the preset password, the requested message history data is read from the storage unit is step S38. If the requested message history data is password protected and the input password does not match the preset password, the conditional request for message history data is not processed.

The message history data read from the storage unit is output in step S39, preferably to a display unit. If the message history data for all other users are stored in the same area of the storage unit, only the message history data associated with the selected other user is read. If a separate area of the storage unit is utilized to store the message history data associated with each other user, the entire area of the storage unit corresponding to the message history data for the selected other user is read.

It is contemplated that the message history data may be output to another device, for example an external memory device, personal computer or notebook computer, in order to conserve the memory space available in the storage unit of the mobile phone. Once the mobile phone is connected to the other device, the user may select a "transmit message history data" function from a menu displayed by the mobile phone to transmit the message history data to the connected device.

Figure 4B:
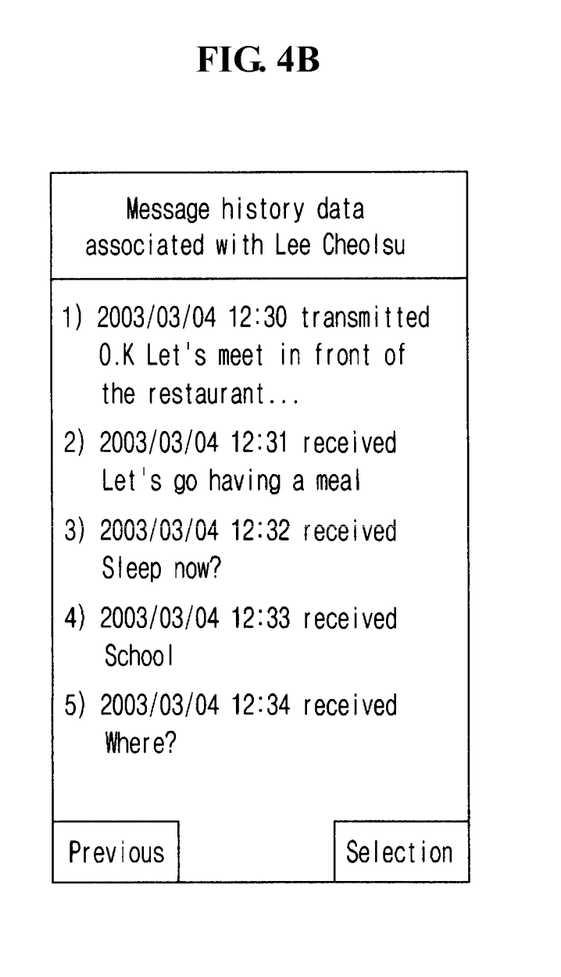
FIG. 4B illustrates a display screen containing the message history data related to messages transmitted to and received from a specific other user according to one embodiment of the present invention.

FIG. 4B illustrates a message history data display in one embodiment of the invention. The message history data may be displayed in chronological order as illustrated in FIG. 4B. Alternatively, the message history data of received messages may be displayed first with the message history data of transmitted messages displayed below it. It is contemplated that the user may select the format of the displayed message history data.

Once the desired message history data is displayed, the user may use the displayed data to confirm details of messages received from or transmitted to other users or select any of the displayed message history data to display additional details of the corresponding message. For example, if the corresponding message is an SMS message, all the details of the message or the entire received or transmitted message may be displayed, and, if the corresponding message is an MMS message, the added file may be displayed.

As illustrated in FIGS. 4A and 4B, the user selects "Lee Cheolsu" as the specific other user for whom message history data is desired. The user may utilize upward and downward shift keys to move the cursor to the name "Lee Cheolsu" or press the "1" numeral key on a keypad of the mobile phone. Once the name "Lee Cheolsu" is selected and the correct password is input if the user has password protected the message history data associated with "Lee Cheolsu," the message history data associated with "Lee Cheolsu" is read from the storage unit and displayed as illustrated in FIG. 4B. The user may simply confirm times or details of messages received from and transmitted to Lee Cheolsu or may select a specific received or transmitted message for which additional information is desired.

Figure 5:
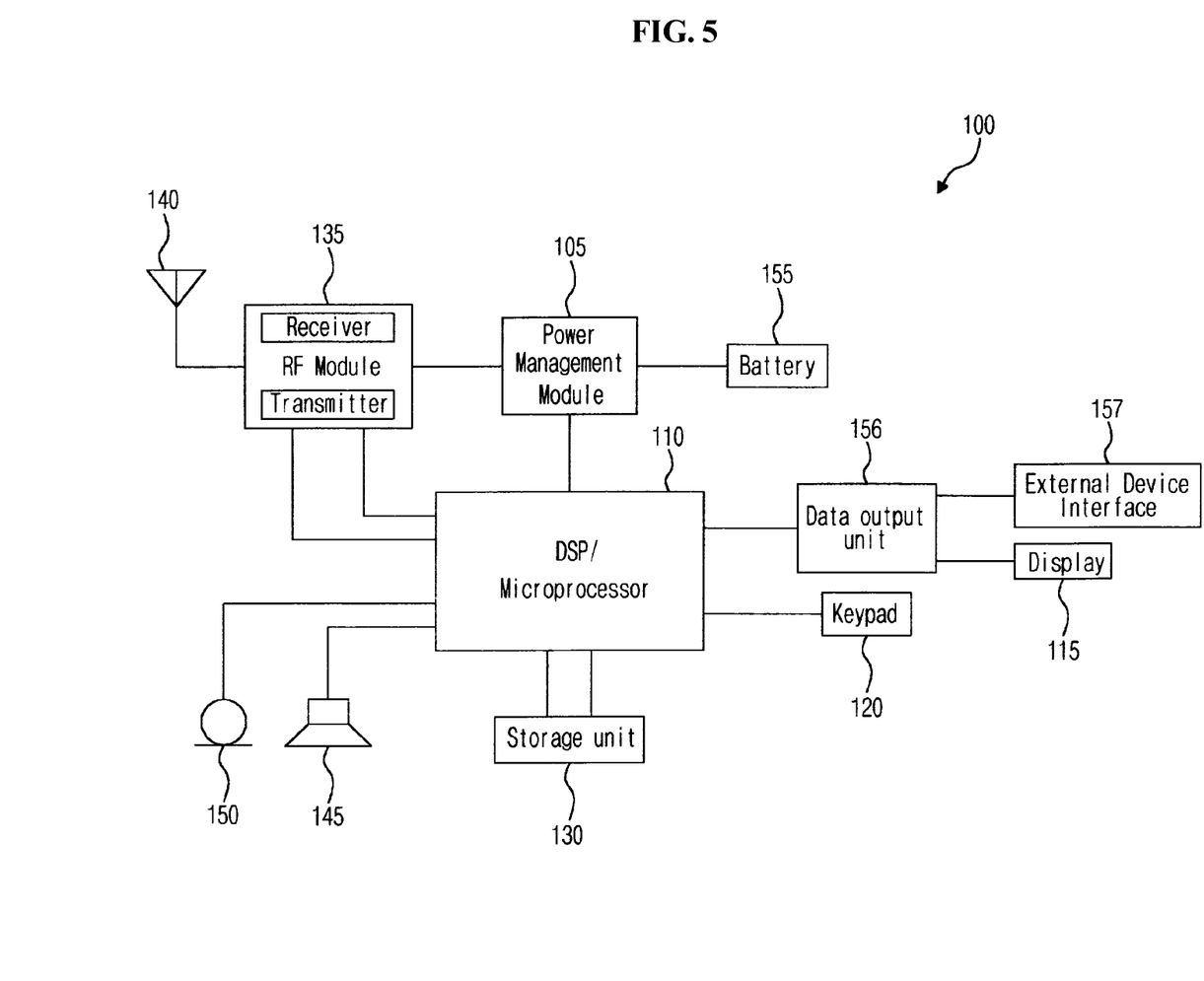
FIG. 5 is a block diagram illustrating a mobile communication device of the present invention for performing the methods illustrated in FIGS. 1-3.

Referring to FIG. 5, a block diagram of a mobile communication device 100 of the present invention is illustrated, for example a mobile phone for performing the methods of the present invention. The mobile communication device 100 includes a processing unit 110 such as a microprocessor or digital signal processor, an RF module 135, a power management module 105, an antenna 140, a battery 155, a display 115, a keypad 120, a memory unit 130 such as flash memory, ROM or SRAM, a speaker 145, a microphone 150, a data output unit 156, and, optionally, an external device interface unit 157.

A user enters instructional information, such as a telephone number, for example, by pushing the buttons of a keypad 120 or by voice activation using the microphone 150. The processing unit 110 receives and processes the instructional information to perform the appropriate function, such as to dial the telephone number. Operational data may be retrieved from the memory unit 130 to perform the function. Furthermore, the processing unit 110 may display the instructional and operational information on the display 115 for the user's reference and convenience.

The processing unit 110 issues instructional information to the RF section 135, to initiate communication, for example, transmit radio signals comprising voice communication data. The RF section 135 comprises a receiver and a transmitter to receive and transmit radio signals. The antenna 140 facilitates the transmission and reception of radio signals. Upon receiving radio signals, the RF module 135 may forward and convert the signals to baseband frequency for processing by the processing unit 110. The processed signals would be transformed into audible or readable information outputted via the speaker 145, for example.

The processing unit 110 is adapted to store message history data of messages received from and messages transmitted to other users in the memory unit 130, receive a conditional request for message history data input by the user, process the conditional request to read message history data corresponding to the conditional request from the memory unit, and output the message history data to the display unit 115. The memory unit 130 is adapted to store message history data of the received messages and the transmitted messages. The data output unit 156 is adapted to provide message history data read from the memory unit to the display unit 115 and to the external device interface 157, if provided. The external device interface 157 is adapted to provide a connection to an external device (not shown) such as an external memory unit, personal computer or notebook computer.

It is contemplated that the processing unit 110 and memory unit 130 may be adapted to store the message history data of the received messages and the message history data of the transmitted messages in separate areas of the memory unit, those areas of the memory unit being separate from the area of the memory unit in which the received messages and transmitted messages are stored such that received messages and transmitted messages may be erased without erasing the corresponding message history data. Furthermore, the processing unit 110 and memory unit 130 may be adapted to store the message history data in chronological order. Moreover, the processing unit 110 and memory unit 130 may be adapted to store the message history data for all received and transmitted messages or for only messages received from and transmitted to specific other users designated by the user.

The processing unit 110 and memory unit 130 may be adapted to store the message history data of messages received from all other users in the same area of the memory unit and the message history data of messages transmitted to all other users in the same area of the memory unit. Alternately, the processing unit 110 and memory unit 130 may be adapted to store the message history data associated with each specific other user together in a specific area of the memory unit such that no area of the memory unit comprises message history data associated with more than one specific other user.

The processing unit 110 is adapted to provide a menu on the display unit 115, thereby allowing the user to select a specific other user for whom message history data is desired, as well as to receive conditional data input by the user, the conditional data indicating the message history data desired by the user. The processing unit 110 may be adapted to allow a password to be input when conditional requests for message history data are processed. The password protection may be utilized for all message history data requests or only for specific message history data designated by the user.

The processing unit 110 may be adapted to arrange the message history read from the memory unit 130 such that the data is displayed on the display unit 115 in chronological order. Alternately, the processing unit 110 may be adapted to arrange the message history read from the memory unit 130 such that the data is displayed on the display unit 115 according to whether the corresponding message was a received message or a transmitted message. The processing unit 110 may be further adapted to output the received or transmitted message corresponding to the message history data read from the memory unit 130 or files attached to the received or transmitted message corresponding to the message history data.

The processing unit 110 may be adapted to provide message history data to another device via the external device interface unit 157. It is contemplated that the device may be an external memory unit, a personal computer or a notebook computer.

It will be apparent to one skilled in the art that the mobile communication device 100 may be readily implemented using, for example, the processing unit 110 or other data or digital processing device, either alone or in combination with external support logic.

By utilizing the present invention, the user of a mobile communication device may conveniently manage the message history data corresponding to messages received and transmitted. The user may select to store the message history data associated with all messages received and transmitted or only the message history data associated with specific designated users. The user may password protect the stored message history data and retrieve the stored message history data for messages received from or transmitted to a specific other user or the stored message history data according to another user-specified condition such as "all received or transmitted messages" or "all messages received and transmitted during a specific period of time."

It will be apparent to one skilled in the art that the preferred embodiments of the present invention can be readily implemented using, for example, the processor 110 or other data or digital processing device, either alone or in combination with external support logic.

Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, WCDMA, etc.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The logic implementation shown in the figures described specific operations as occurring in a particular order. In alternative implementations, certain of the logic operations may be performed in a different order, modified or removed and still implement preferred embodiments of the present invention. Moreover, steps may be added to the above described logic and still conform to implementations of the invention.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A method of displaying information related to messages communicated in a mobile communication device, the method comprising:
    displaying a list of a plurality of message history data, each message history data in the list identified by a corresponding identifier of a specific communication target that communicated with the mobile communication device;
    receiving input for selecting a specific message history data from the list; and
    displaying information associated with the selected specific message history data in response to the input, the information displayed in a first portion of a display screen of the mobile communication device, in relation to a second portion of the display screen, while the identifier of the specific communication target is displayed in the second portion of the display screen,
    wherein the displayed information comprises:
        at least one message that was received from the specific communication target;
        time information associated with the received at least one message;
        at least one message that was transmitted to the specific communication target;
        time information associated with the transmitted at least one message;
        status information indicating whether each of the received at least one message and the transmitted at least one message is a received message or a transmitted message; and
    content information for the received at least one message and the transmitted at least one message.

2. The method of claim 1, further comprising:
    deleting the received or transmitted at least one message from the information associated with the selected specific message history data.

3. The method of claim 2, wherein the received or transmitted at least one message is selectively deleted from the information associated with the selected specific message history data.

4. The method of claim 1, wherein the identifier of the specific communication target comprises a name or a nickname associated with the specific communication target.

5. The method of claim 1, wherein the received at least one message and the transmitted at least one message are sorted in chronological order when the information associated with the selected specific message history data is displayed.

6. The method of claim 1, wherein the second portion of the display screen is exclusive of the first portion of the display screen.

7. The method of claim 1, wherein the text message comprises a short message service (SMS) message and a multimedia message service (MMS) message.

8. The method of claim 1, wherein the specific message history data comprises a plurality of messages communicated between the mobile communication device and the specific communication target.

9. The method of claim 8, wherein at least two of the plurality of messages are displayed concurrently on the display screen.

10. The method of claim 8, wherein each of the plurality of messages displayed on the display screen is associated with corresponding time information, status information, and content information.

11. The method of claim 1, wherein the corresponding identifier of the specific communication target comprises at least a user name of the specific communication target.

12. The method of claim 1, wherein the corresponding identifier of the specific communication target comprises at least a phone number of the specific communication target.

13. The method of claim 1, further comprising:
receiving conditional data identifying at least one desired message history data; and
displaying a list of the at least one desired message history data identified based on the received conditional data.

14. The method of claim 1, wherein the content information comprises at least partial content of the received or transmitted at least one message.

15. The method of claim 1, wherein each of the plurality of message history data is a list comprising at least one message communicated by the mobile communication device.

16. The method of claim 1, wherein the identifier of the specific communication target comprises a phone number associated with the specific communication target.

17. A method of displaying information related to messages communicated in a mobile communication device, the method comprising:
displaying, on a first portion of a display screen of the mobile communication device, a list of messages communicated between the mobile communication device and a specific communication target; and
displaying, on a second portion of the display screen, identifying information about the specific communication target while the list of messages is displayed on the first portion, the identifying information comprising at least a name, a phone number, or a nickname of the specific communication target,
wherein the displayed list of messages comprises:
at least one message received from the specific communication target;
time information associated with the received at least one message;
at least one message transmitted to the specific communication target;
time information associated with the transmitted at least one message;
status information indicating whether each of the received at least one message and the transmitted at least one message was received or transmitted by the mobile communication device; and
content information for the received at least one message and the transmitted at least one message.

18. The method of claim 17, wherein the time information, the status information, and the content information are arranged according to a preset pattern in the list of messages such that at least the time information is aligned on a same axis on the display screen when more than one time information is present in the list of messages.

19. The method of claim 17, further comprising:
displaying a list of at least one communication target including the specific communication target; and
receiving input for selecting the specific communication target from the list of at least one communication target, wherein the list of messages is displayed in response to the input.

20. The method of claim 19, wherein the content information includes at least partial content of the received or transmitted at least one message.

21. The method of claim 20, further comprising:
receiving input for selecting the received or transmitted at least one message from the list of messages.

22. The method of claim 21, further comprising:
displaying entire content of the received or transmitted at least one message in response to the input.

23. The method of claim 21, further comprising:
displaying content of a file attached to the received or transmitted at least one message in response to the input.

24. The method of claim 17, wherein the messages comprise a short message service (SMS) message and a multimedia message service (MMS) message.

25. The method of claim 17, further comprising:
receiving input for specifying a specific period of time such that only messages received or transmitted during the specific period are included in the list of messages.

26. The method of claim 17, wherein all messages in the list of messages have been received from the specific communication target or transmitted to the specific communication target.

27. A method of displaying messages in a mobile communication terminal configured to communicate messages, the method comprising:
storing messages transmitted and received by the mobile communication terminal in association with one or more identifiers identifying corresponding one or more communication targets;
receiving an input for selecting a specific identifier from the one or more identifiers; and
displaying a list comprising at least one message associated only with the selected specific identifier on the mobile communication terminal's display screen,
wherein the displayed list further comprises:
at least one message received from a communication target identified by the selected specific identifier;
time information associated with the received at least one message and including at least one date and at least one time when the at least one message was received;
at least partial message content for the received at least one message;

at least one message transmitted to the communication target identified by the selected specific identifier;

time information associated with the transmitted at least one message and including at least one date and at least one time when the at least one message was transmitted; and at least partial message content for the transmitted at least one message, wherein the displayed time information is aligned along a vertical axis on the display screen when more than one date and more than one time are displayed in the list such that the received at least one message and the transmitted at least one message are displayed in chronological order according to the time information, and wherein the list is displayed in a first portion of the display screen, in relation to a second portion of the display screen, while the specific identifier is displayed in the second portion of the display screen.

28. An apparatus for displaying information related to messages communicated by a mobile communication device, the apparatus comprising:

a display;

a memory configured to store messages transmitted and received by the mobile communication device in association with one or more identifiers identifying corresponding one or more communication targets; and a controller configured to cause displaying of a list comprising at least one message associated only with a specific identifier on the display when the specific identifier is selected from the one or more identifiers, wherein the displayed list further comprises:

at least one message received from a communication target identified by the selected specific identifier;

at least one message transmitted to the communication target identified by the selected specific identifier;

time information associated with the received at least one message and including at least one date and at least one time when the at least one message was received;

time information associated with the transmitted at least one message and including at least one date and at least one time when the at least one message was transmitted;

at least partial message content for the received at least one message; and at least partial message content for the transmitted at least one message, wherein the displayed time information is aligned along a vertical axis on the display when more than one date and more than one time are displayed in the list such that the received at least one message and the transmitted at least one message are displayed in chronological order according to the time information, and wherein the list is displayed in a first portion of the display, in relation to a second portion of the display in which the specific identifier is displayed.

29. The apparatus of claim 28, wherein the controller is further configured to:

cause displaying, on the display, a list of at least one communication target including the specific communication target, wherein the list of messages communicated between the mobile communication device and the specific communication target is displayed in response to input for selecting the specific communication target from the list of at least one communication target.

30. The apparatus of claim 28, wherein the received or transmitted at least one message is selectively deletable from the list of messages.

31. The apparatus of claim 28, wherein the identifying information comprises a name or a nickname associated with the specific communication target.

32. The apparatus of claim 28, wherein the received at least one message and the transmitted at least one message of the list of messages are sorted in chronological order.

33. The apparatus of claim 28, wherein the second portion of the display screen is exclusive of the first portion of the display screen.

34. The apparatus of claim 28, wherein the time information, the status information, and the at least partial message content are arranged according to a preset pattern in the list of messages such that at least the time information is linearly aligned on the display screen when more than one time information is present in the list of messages.

35. The apparatus of claim 28, wherein the messages comprise a short message service (SMS) message and a multimedia message service (MMS) message.

36. The apparatus of claim 28, wherein the identifying information comprises a phone number associated with the specific communication target.

37. An apparatus for displaying information related to messages communicated by a mobile communication device, the apparatus comprising:

a display configured to display a list of a plurality of message history data, each message history data in the list identified by a corresponding identifier of a specific communication target that communicated with the mobile communication device; and a controller configured to cause the display to display information associated with the selected specific message history data in response to input for selecting a specific message history data from the list, wherein the information is displayed in a first portion of a display screen of the display, in relation to a second portion of the display screen, while the identifier of the specific communication target is displayed in the second portion of the display screen, and wherein the displayed information comprises:

at least one message that was received from the specific communication target;

time information associated with the received at least one message;

at least one message that was transmitted to the specific communication target;

time information associated with the transmitted at least one message;

status information indicating whether each of the received at least one message and the transmitted at least one message is a received message or a transmitted message; and content information for the received at least one message and the transmitted at least one message, wherein the messages comprise a short message service (SMS) message and a multimedia message service (MMS) message.

38. The apparatus of claim 37, wherein the corresponding identifier of the specific communication target comprises at least a phone number of the specific communication target.

39. The apparatus of claim 37, wherein the controller is further configured to delete the received or transmitted at least one message from the information associated with the selected specific message history data.

40. The apparatus of claim 39, wherein the received or transmitted at least one message is selectively deleted from the information associated with the selected specific message history data.

41. The apparatus of claim 37, wherein the identifier of the specific communication target comprises a name or a nickname associated with the specific communication target.

42. The apparatus of claim 37, wherein the received at least one message and the transmitted at least one message are sorted in chronological order when the information associated with the selected specific message history data is displayed.

43. The apparatus of claim 37, wherein the second portion of the display screen is exclusive of the first portion of the display screen.

44. The apparatus of claim 37, wherein the specific message history data comprises a plurality of messages communicated between the mobile communication device and the specific communication target.

45. The apparatus of claim 44, wherein at least two of the plurality of messages are displayed concurrently on the display screen.

46. The apparatus of claim 44, wherein each of the plurality of messages displayed on the display screen is associated with corresponding time information, status information, and content information.

47. The apparatus of claim 37, wherein the corresponding identifier of the specific communication target comprises at least a user name of the specific communication target.

48. The apparatus of claim 37, wherein the controller is further configured to cause the display to display a list of at least one desired message history data identified based on conditional data received, the conditional data identifying the at least one desired message history data.

49. The apparatus of claim 37, wherein the content information comprises at least partial content of the received or transmitted at least one message.

50. The apparatus of claim 37, wherein each of the plurality of message history data is a list comprising at least one message communicated by the mobile communication device.

* * * * *